3 Sheets—Sheet 1.
R. E. HOUSE.
PRINTING TELEGRAPH.
No. 813. Reissued Sept. 20, 1859.
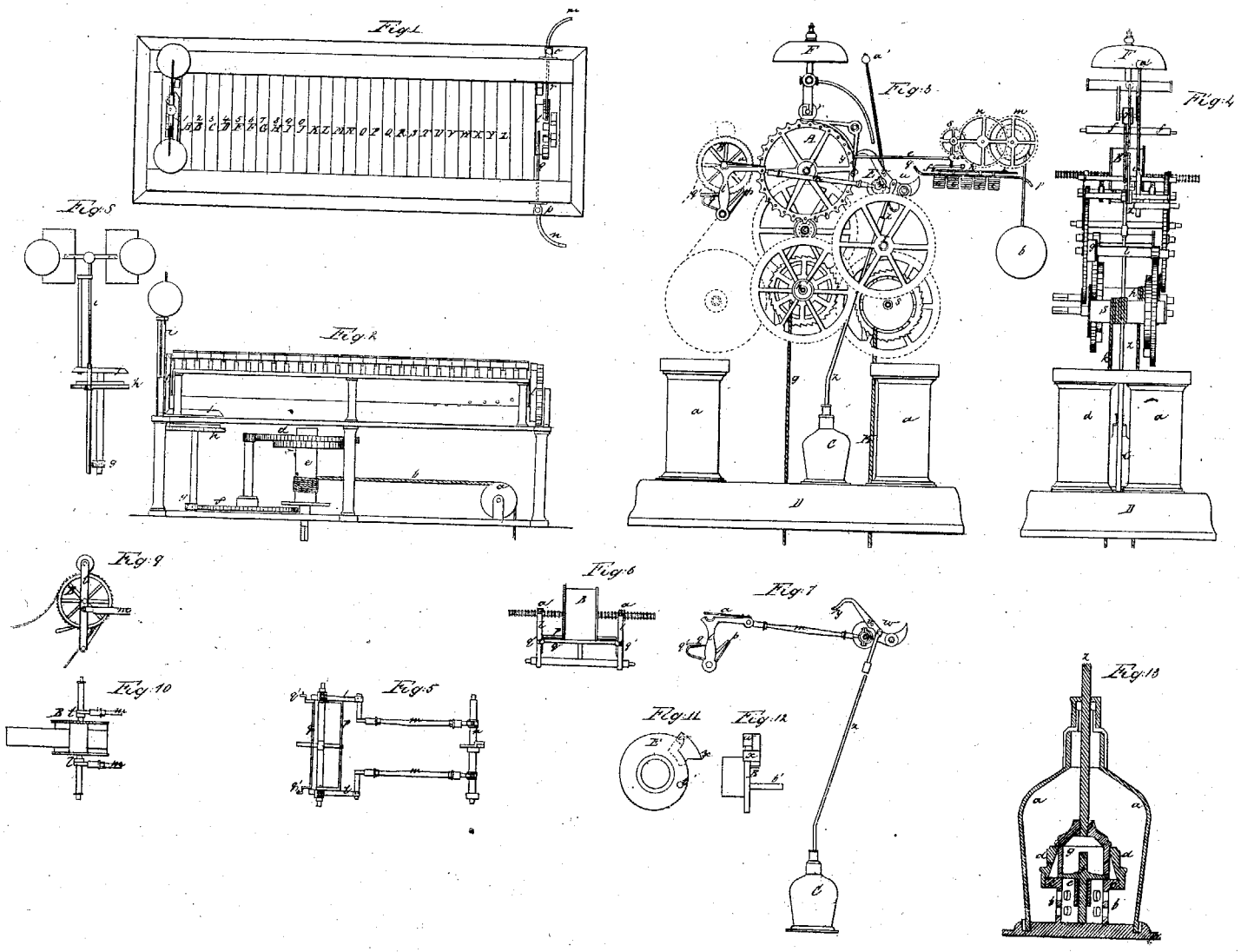

R. E. HOUSE.
PRINTING TELEGRAPH.
No. 813. Reissued Sept. 20, 1859.
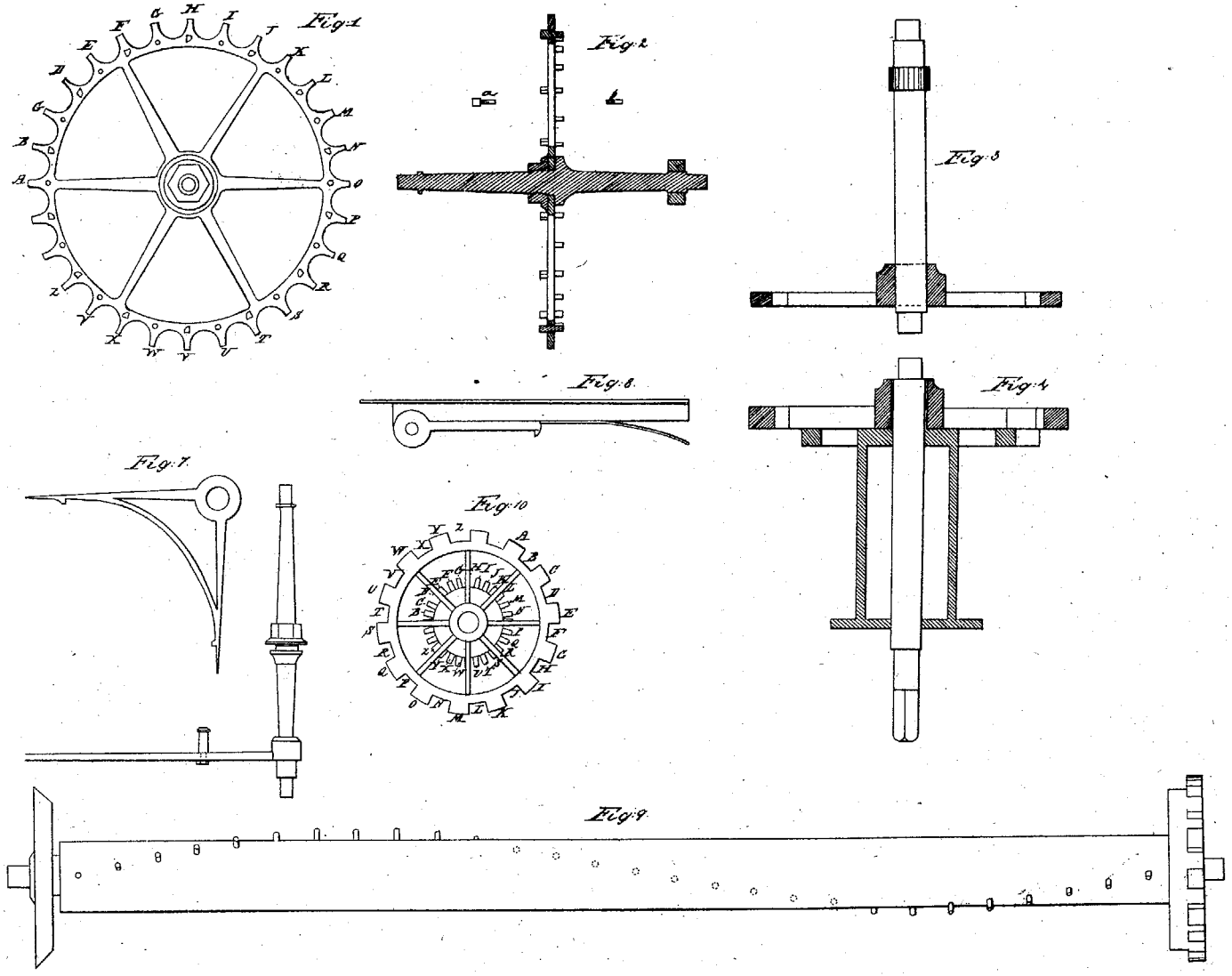

3 Sheets—Sheet 3.
R. E. HOUSE.
PRINTING TELEGRAPH.
No. 813.
Reissued Sept. 20, 1859.
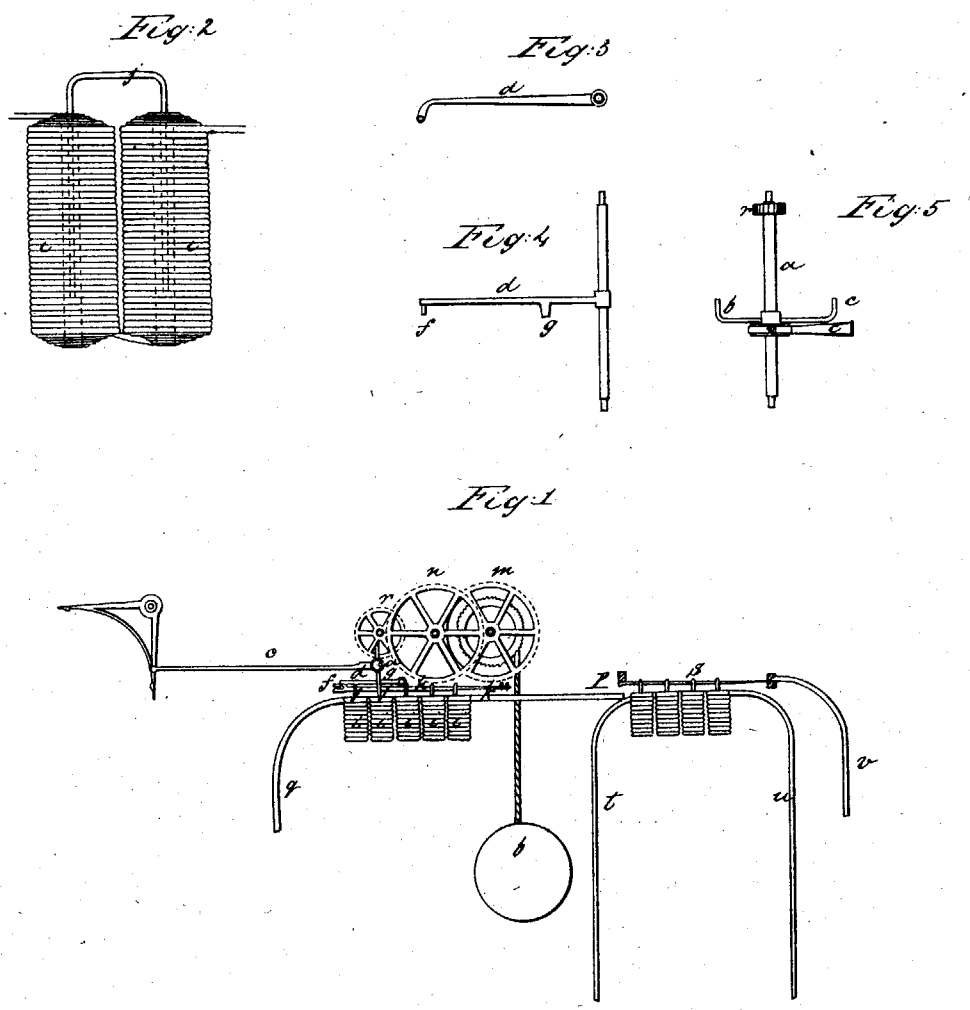

UNITED STATES PATENT OFFICE.

ROYAL E. HOUSE, OF BINGHAMTON, NEW YORK.

IMPROVEMENT IN MAGNETIC PRINTING-TELEGRAPHS.

Specification forming part of Letters Patent No. 4,464, dated April 18, 1846; Reissue No. 813, dated September 20, 1859.

*To all whom it may concern:*

Be it known that I, ROYAL E. HOUSE, now of Binghamton, State of New York, and formerly of the city of New York, in the United States of America, have invented certain improvements in machinery for transmitting intelligence between distant places and permanently recording the same in letters or other signs by the employment of electric or galvanic currents, which I do denominate and call the "The Improved Magnetic Letter-Printing Telegraph," of which the following is a full and accurate description.

I shall first describe the whole of said machinery as constructed and combined by me for practical operation, and then I shall point out and distinguish the particular parts and combinations which I claim as my invention, and which I desire to secure by Letters Patent. Said machine consists of two parts: first, of that part which is to be stationed at the place from which intelligence is to be transmitted, and which, for convenience of distinction, I denominate the "composing machine; second, of that part which is to be stationed at the place to which intelligence is to be communicated, and which, for the same reason, I denominate the "printing-machine." These two parts are to be connected by an electric or galvanic conductor, which conductor is to be in connection with any known generator of electricity or galvanism, and form a circuit through or along which, when connected, a current of electricity or galvanism will pass, and for some part of the distance through coils. These two parts of said machinery are chiefly propelled by some prime mover, such as the power of weights, the electric or galvanic currents being applied and used only to regulate the motions by means substantially as hereinafter described, and thus the advantage of the instantaneous action of magneto-electric or galvanic force and the power of a prime mover are combined in the accomplishment of the work for which the machinery is intended.

I shall first explain the composing-machine; and in order that the same may be better understood, I shall describe it in connection with the drawings, which are hereunto annexed, the drawings of Figures 11, 12, and 13 on Sheet I, as well as those on Sheet II, being on a larger scale than the others.

The composing-machine, as before stated, is to be stationed at the place from which the intelligence or message is to be communicated, and is to be worked or operated upon by the person desiring to transmit such intelligence or message. Its object is to break or close the circuit at the option of the operator, in such manner as to cause any given letter to be printed by a printing-machine. Said composing-machine has twenty-eight keys, (more or less,) which I call the "finger-keys," a shaft placed under the keys, which I call the "key-shaft," a wheel fixed to the end of this shaft, which I call the "circuit-wheel," which is, in fact, a rotating part of the circuit, a governor attached to the machine, and a weight and pulley with a series of wheels and pinions to give motion to said key-shaft.

The parts of the composing-machine are to be arranged in any suitable frame made of any suitable material, the precise form not being material, so long as so made as to be suitable to sustain the different parts of the machinery in the positions and connections substantially as I shall hereinafter describe.

This part of my machine is represented by Figs. 1 and 2 of Sheet I of the drawings. Fig. 1 exhibits the plan, and Fig. 2 the side elevation. In giving a particular description of the parts composing it, I will commence with the power by which the machinery is propelled, following it through its different connections, and pointing out the object and construction of the parts.

This composing-machine is propelled by a weight attached to the cord *b*, which passes over the fixed pulley *a*, and is wound round the barrel *c*. This barrel is hung on an axle, which has at one end the cog-wheel *d*, the barrel being connected with the axle and cog-wheel by a ratchet arranged in the ordinary and well-known manner of similar fixtures in other machinery for permitting the winding up of a weight which shall give out power in its descent. The cog-wheel *d* works into the pinion *e*, fixed on a shaft which carries the cog-wheel *f*, which engages with the pinion *g*, secured to the same shaft which carries the wheel *h*, engaging with a pinion on the shaft *i*, which carries the governor.

The upper end of the axle, to which is attached the cog-wheel *h*, is extended upward, and carries the bevel friction-wheel *j*. This wheel acts upon and drives a similar wheel, *k*, attached to the end of the key-shaft, and in this way motion is communicated to the key-shaft, a part of the weight thereof resting upon the friction-wheel, so as to insure sufficient friction to cause the shaft to revolve.

The key-shaft extends lengthwise through the frame, and may run in any convenient bearings fixed in the ends of said frame. In this shaft are fixed the same number of pins as there are keys extending out from the surface of the shaft, and placed in a helical row extending its whole length. These pins are represented in Fig. 2 of Sheet I and Fig. 9 of Sheet II of the drawings as twenty-eight in number, twenty-six of them corresponding to the several letters of the alphabet, one of them to a dot, and one of them being left blank.

Fixed upon the end of the key-shaft is the metallic wheel *l*, which revolves with said shaft and is used for breaking and closing the circuit of conductors, and I have therefore called it the "circuit-wheel," it being, in fact, a rotating part of the circuit. Fig. 9 of Sheet II of the drawings is a side elevation of said key-shaft and metallic circuit-wheel. This is a double wheel—that is, the inside of the wheel is about three-quarters of an inch less in diameter than the outside. On the periphery of the outside or larger part of this wheel are cut fourteen cogs, forming between them fourteen spaces. The periphery of the inside or smaller portion of this wheel is smooth. This wheel is connected with the circuit of electric or galvanic conductors and forms a part of the same, as follows: *m* and *n* in Fig. 1 of Sheet I of the drawings are ends of wire or metallic rods forming a part of said circuit which connects the composing and printing machines, and also connects one with the positive and the other with the negative pole of a battery or other suitable and known generator of electricity or galvanism. These wires or rods *m* and *n* are inserted into the metallic binding-screws *o* and *p*, which are fixed into and pass through the frame, so as to have a small projection on the inside. To these projections are attached two metallic springs, *q* and *r*, one end of the spring *q* bearing upon the smooth portion of the periphery of the circuit-wheel and one end of the spring *r* bearing upon the cogs cut upon the periphery of the outer portion of the said wheel. This wheel is designed to turn toward the spring *q* and from the spring *r*, so that it may meet with no obstruction from the end of the spring *r* catching between the cogs, the arrangement being such that the springs and conducting-wires are insulated or out of metallic contact with all parts of the machinery except the rotating part of the circuit or circuit-wheel. As the said circuit-wheel revolves the spring *r* will slide over the ends of the cogs, and also pass over or through the spaces between them, and thus the circuit of conductors will be broken when the spring *r* passes over or through a space and closed when it slides over a cog, the end of the spring *q* in the meantime remaining constantly in contact with the smooth portion of the periphery of said wheel. Each one of these cogs and spaces corresponds with one of the pins in the key-shaft and with one of the finger-keys. The cogs and spaces are therefore lettered in the drawings with the same characters as are the said finger-keys and pins. Fig. 10 of Sheet II of the drawings exhibits an end elevation of said circuit-wheel and key-shaft. The position of the finger-keys in the frame is shown by Fig. 2 of Sheet I of the drawings. The keys are hung upon a small rod, which passes through them at one end, and on which they may play up and down. These keys may be made of any convenient material; but I construct them of wood with ivory tops, and on the under side of them there is a metallic spring with a catch or cog to make contact with the pins in the key-shaft. Fig. 8 of Sheet II of the drawings represents a side elevation of one of these keys. The free end of the spring bears upon a bar, and will raise the key when released from the pressure of the finger.

The use of the governor above mentioned is two fold: first, to equalize the motion of the machinery, preventing its running with too great velocity, and, second, in some degree to keep up the velocity of the wheel-work when the key-shaft has been stopped by the pressing down of one of the finger-keys, so that said shaft will resume its motion speedily on being liberated by the raising of the key. This "governor," as I have termed it, is caused to revolve by means of the cog-wheel *h*, as above described, and consists of two parts: first, a retarding-fly or rotating vane, and second, of heavy balls moving with the vane, the former acting to prevent too great velocity and the latter aiding by their momentum in keeping up velocity when additional labor is imposed upon the prime mover, both parts being clearly shown in the drawings, and when the key-shaft is stopped the balls, by their momentum, aid the weights to drive the machinery, which has the additional labor then imposed upon it of causing the friction-wheel *j* to slide round under the friction-wheel *k*, so that when the finger-key is permitted to rise and the catch or cog on the under side of it slips off from the pin in the shaft, the machinery, being still in motion, will cause the shaft to resume its motion more quickly than it would if no weighted balls or their equivalents were used.

I will now explain the connected operation of this part of my machine. Each key has a corresponding pin in the key-shaft and either a space or a cog on the circuit-wheel, with which it corresponds and to which it belongs. I have also stated that this part of my magnetic letter-printing telegraph is to be stationed at the place from which intelligence is to be communicated, and it is to be used either for breaking or closing the circuit of conductors, so as to cause any given letter or character to be printed at the place to which communication is to be made. The manner of producing this effect is as follows: First, it may be observed from what has been stated that when the key-shaft, and consequently the circuit-wheel, are put into motion by the agency of the weight attached to the cord *b*, as described, the circuit of conductors will be broken and closed in rapid succession—that is, it will be broken whenever the spring *e* passes through a space between the cogs and closed whenever it slides over the end of a cog. While this process continues by the uninterrupted revolution of said shaft and wheel no printing will be done, for reasons hereinafter explained, and the effect thus far will be only to cause the type-wheel in the printing part of the machinery to revolve synchronously with the circuit-wheel and to bring it into the proper position for the printing to take place, as will be hereinafter described. When, however, a letter or other character is to be printed, it is necessary in the precise machine herein described that the motion of said shaft and circuit-wheel should be arrested, allowing said circuit to remain either broken or closed till the desired letter is printed; and this is done by merely pressing down a finger-key. For example, if desirable to print, say, the letter A, the finger-key A must be pressed down. This catches the pin A in the shaft, arresting the motion of the shaft and of the circuit-wheel at the same time that the spring E will be on the cog A, and the circuit of the conductors will thus be closed, and, being closed, a current of electricity or galvanism will pass through the circuit, causing the letter A to be printed at the place to which the message is to be communicated. If desirable to print the letter B, then the finger-key B should be pressed down, which, catching the pin B, will stop the motion of the shaft and wheel while the spring E is in the space B of said circuit-wheel, and the circuit of conductors being thus broken, the current of electricity or galvanism will cease, causing the letter B to be printed. In like manner any other letter, or the dot, or the blank space may be formed by merely pressing down the key marked with such letter, dot, or left blank, a like effect being produced upon the printing-machine by either breaking or closing the circuit, all of which will be understood by the examination of the parts hereinafter explained and described; and it will be perceived that the first result of such a striking of any given key is to cause a current to pass or a circuit to be broken when the rotating part of the circuit is in some fixed and determined angular position corresponding with the key that is struck—that is to say, suppose a hand or pointer was fixed on the circuit-wheel, and that hand pointed to the zenith when key A came in contact with pin A on the key-shaft, then when A was released and B struck the hand would vary from the zenith one twenty-eighth part of three hundred and sixty degrees, and so in succession by the same angular distance, as each key on the key-board was successively strick the circuit would be broken or closed with the rotating part of the circuit in some definite angular position corresponding to the key struck.

I will now proceed to describe that part of the said magnetic letter-printing telegraph to be stationed at the place to which intelligence is to be transmitted and which, for convenience of distinction, I have denominated the "printing-machine."

A front elevation of said printing-machine is exhibited by Fig. 3 of Sheet I of the drawings, and which, for further convenience of distinction, I subdivide into parts 1 and 2, as indicated in the drawings. Fig. 4 of said sheet exhibits an end elevation of part first detached from part second. This machine consists of the basis or bottom D, of any convenient thickness, supporting-legs, *a a*, of any convenient length, upon which is to be erected a frame-work or case suitable for bearings for the different axles to run in, and to sustain the machinery. This frame-work has been omitted in the two last-mentioned figures, because no particular form of it is necessary, and, if represented, it would obscure the parts of the machinery more important to be exhibited. *f* of part first of the printing-machine is an axle or shaft hung in the frame. On this shaft, at or near its center, is fixed an escapement with two arms, the angular part being fixed to the shaft, as shown by the drawings. A front elevation of this escapement is shown by Fig. 7 of Sheet II of the drawings. This escapement is carried or caused to vibrate as I shall now describe, the machinery in part 2, Fig. 3 of Sheet I of the drawings, being employed for this purpose.

*e* is an eccentric-rod with one end connected to one arm of the escapement by means of a pin, on which it may easily work, the other end thereof being fastened to an eccentric-ring surrounding an eccentric upon a shaft, *a*. (See part 2 of Fig. 3.) Fig. 5 of Sheet III of the drawings is a plan of said shaft and eccentric with its rod attached, and also of two arms, *c* and *b*, one end of each of which is attached to the shaft near the eccentric, the other or outer ends of said arms being bent at right angles, as shown by the drawings. These arms may be made of small wire.

*d* is an arm attached to and extending out from a rock-shaft hung in the frame. Fig. 4 of the last-mentioned sheet of the drawings is a plan of this arm and shaft, and Fig. 3 an elevation of the same.

*f* and *g* are small pins or detents inserted in the arm *d*. The pin *g* is intended to catch the bent ends of the arms *c* and *b* as the shaft into which the said arms are fixed revolves. The pin *f* plays in a slot or hole formed in the end of the rod *h*. *i i i i i* are helical coils of wire, wound in the usual manner, so as to form an electrical helix, with a small orifice or hole at or near the center of the mass of said coils, sufficient to admit therein a small piece of steel, *j*. These coils of wire are arranged in pairs. Fig. 2 of said Sheet III of the drawings exhibits an elevation of one pair of said coils of wire with a piece of steel placed in it.

*j* is a small steel rod bent in two places at right angles, which is magnetized by the operation of the electric currents; or it may be bent in the form of a horseshoe-magnet, with the two legs or ends straight and passing loosely into the ends or holes formed as aforesaid in the said coils of wire, as shown in part 2 of said Fig. 3 of Sheet I, and as also shown by Fig. 1 of Sheet III of the drawings; but I do not wish to be understood as confining myself to any particular number or size of pieces of steel or coils, or to any particular means of producing motion by attraction or repulsion induced by electric or galvanic currents. The number and size indicated by the drawings have been used for practical purposes; but other numbers and other sizes may be used.

*h* is a small metallic bar or rod attached to and connecting the tops of said pieces of steel by joints, and with one end, *k*, firmly attached to the frame. The part of this rod near the end *k* which is attached to the frame should be made so as to act as a spring, so that the other end of said rod, together with said pieces of steel, may easily play up and down.

*b* is a weight attached to a cord which winds round a drum or barrel hung upon one axle, and arranged with a ratchet-wheel, in the ordinary and well-known manner for conveniently winding up the weight when the same shall have run down.

The cog-wheel *m* is upon the same shaft upon which the drum is hung, and works into a pinion, and carries the wheel and axle *n*. The cog-wheel *n* engages with a pinion and carries the wheel and axle *o*. The cog-wheel *o* works into a pinion, *r*, on one end of the shaft *a*, before described, and thus the shaft *a* is caused to revolve by the power of the weight, the wheels and pinions being of such comparative size as to give sufficient velocity to the shaft, the proportion of wheels and pinions to each other, as shown in the drawings, being a good one for the purpose.

I will next explain the operation of the machinery thus described, the object of which is to give the proper motion to the escapement, as above stated. This is as follows: The weight *r*, by means of the series of wheels and pinions, connected as above described, gives motion to the shaft *a*, on which is fixed the eccentric to which the connecting-rod *e* is attached, and if the motion of said shaft were not interrupted, it would revolve with great rapidity as long as said weight should be kept wound up, and inasmuch as the connecting-rod *e* is attached to the eccentric placed upon said shaft, said connecting-rod will be once projected forward and once drawn back at each revolution of the shaft. This motion of the connecting-rod causes the escapement to vibrate.

The manner of regulating the motion of the shaft *a* by an application of the electric or galvanic force and by breaking and closing the circuit is as follows: *p* and *q* are continuations of the wire forming the coils before described. One is the positive and the other is the negative pole forming part of the circuit, which extends through the rotating circuit-wheel when the spring is in contact with the cogs thereof, and thence to the station, where the printing-machine is located. When the circuit is closed and a current of electricity or galvanism passes through or along said wire, the pieces of steel, being thereby magnetized, are drawn down together with the rod *h*, to which they are attached, and when the circuit is broken and the current of electricity or galvanism ceases to pass the rod *h*, which is a spring at one end, as described, rises by force of this spring, carrying with it the pieces of steel, and thus this rod will play up and down as often as the circuit of conductors is broken and closed, or as often as a current of electricity passes and ceases to pass along or through the wire forming said coils. When said rod is drawn down it carries with it the end of the arm *d* by means of the pin *f* in said arm, which passes through the slot or hole in the end of said rod, and when said rod elevates itself it also carries the end of said arm with it. This motion, it will be observed, changes the position of the pin *g*, causing it to rise and fall as the end of said arm rises and falls. The bent ends of the arm *c* and *b* each in turn come in contact with the pin *g* at every revolution of the shaft *a*. The arm *c* is longer than the arm *b*, so that the bent end of the arm *c* will come in contact with the pin *g* when the pieces of steel or magnets are drawn down, and the pin *g* is therefore at its greatest distance from the shaft *a*, or from the center of motion of the arms *c* and *b*.

The arm *b* must be of such length that its bent end will be arrested by the pin *g* when the magnets or pieces of steel and rod *h* are raised, and the pin *g* is therefore nearest to the shaft *a*, or to the center of motion of the said arms *c* and *b*. The bent ends of said arms strike said pin in a horizontal position, the side of the bent end of the arm coming in contact with the side of the pin, so that one is parallel to the other, and so that the pin may easily slip below or be raised above the bent ends of said arms. When, therefore, the pieces of steel or magnets are drawn down, carrying with them the rod *h* and the end of the arm, the pin is carried down, and the bent end of the short arm *b*, with which it was in contact, is thereby liberated, and the shaft and eccentric performs half of one revolution, and the connecting-rod *e* will be drawn back until the bent end of the long arm *c* strikes against the pin *g* and stops the motion of the shaft, which will remain so until the magnets, the rod *h*, and the end of the arm *d* are elevated, when the pin

*g* will be raised, and, liberating the bent end of the long arm *c*, the shaft *a* and the eccentric to which said connecting-rod is attached will again revolve half round, projecting said connecting-rod forward, and thus the motion given to the connecting-rod *e*, and consequently to the escapement, by the weight *l*, as hereinbefore described, is regulated by the power of electricity or galvanism.

The arrangement and machinery above described will be sufficient and operate successfully unless the distance between the composing-machine or transmitting-station at which the circuit is broken and closed and the printing-machine be very great. When this distance is very great it may be found necessary to add the power of a less extended and separate current of electricity or galvanism to increase the electric or galvanic force acting upon said magnets. This may be done by having an additional apparatus to operate in connection with that above described, and which is shown by part 3 of Fig. 1 of Sheet III of the drawings, being represented in connection with part 2 already described. This consists of a set of coils and magnets connected by a rod at the top similar to those already described in part 2.

*s* is the rod connecting the magnets, one end of which is to be connected with the wire forming a part of an electric or galvanic circuit. The poles of this additional apparatus are *u* and *t*, and these poles should be connected in the circuit extending to and connecting with the composing-machine, and, when used in connection with part 2 aforesaid, may, for distinction, be denominated the "first circuit," and the circuit in which part 2 is connected, for the same reason, may be called the "second circuit." When these two parts are used together the poles of the second circuit will be *q* and *v*. The second circuit may extend only a short distance from the printing-machine, and be broken and closed by the first circuit—that is, the breaking and closing the first circuit also breaks and closes the second circuit, as follows: When the first circuit is closed and the magnets in this circuit and the rod *s* connecting them are drawn down, the end of said rod *s* comes in contact with the wire or pole *p* and closes the second circuit. When the first circuit is broken the rod *s*, forming a spring at one end, will rise, thereby breaking the second circuit.

The rod *s* should be a good conductor of electricity, and thus when the first circuit is closed the second is closed also, and when the first circuit is broken the second is broken also, and therefore breaking and closing the first circuit by means of the composing-machine before described is, in effect, breaking and closing both circuits, and as a very small force is necessary to break and close the second circuit, the first circuit will afford sufficient electric force to break and close the second at great distances in the manner described, and, if the distance should be so great as to require it, there may be duplicates of part 3 at intermediate places.

The poles *v* and *q* of the second circuit may be connected with a battery or other known generator of electricity or galvanism placed at a short distance therefrom, and in the same or an adjoining room in which the printing-machine is placed, if desired; and in this way the disadvantage of the loss of the electric or galvanic force from the distance between the composing and the printing machines is obviated, and the power of a battery or other generator of electricity or galvanism placed at a short distance from the magnets in the second circuit is brought to bear thereon.

In the foregoing description of my magnetic letter-printing telegraph I have spoken of circuits of electric or galvanic conductors. By this I intend to be understood as meaning any well-known arrangement or means of causing a current of electricity or galvanism to pass through or along a conductor extending from the composing to the printing machine, such as a single insulated wire in connection with a battery and with the earth at the two ends thereof.

Having now explained the means and manner of giving motion to the escapement, I will proceed with further explanation of part 1 of the printing-machine.

A is a wheel fixed to an axle hung in the frame parallel to the shaft *f*, which wheel may be about six inches in diameter and one-eighth of an inch thick. On the periphery of this wheel are twenty-eight protuberances, formed as shown by the drawings, Fig. 1 of Sheet II representing a side elevation of said wheel and its axle, and Fig. 2 of the same sheet a section through the wheel and its axle. On the end of each of twenty-six of these protuberances is a type of a letter or character.

On the end of one of the remaining two is a type of a period or dot, and the remaining one represents a blank, being a little shorter than the others. These letters, dot, and blank correspond respectively with the letters, dot, and blank on the finger-keys above described. This wheel I call the "type-wheel." Fixed in one side of the type-wheel (and for convenience of distinction, say, the front side) are fourteen small metallic pins, which project from the periphery of the wheel.

The arms of the escapement above described extend along the front of the type-wheel, so that the catches of said arms can engage with these pins, the escapement being so adjusted that the pins will not take into both catches at the same time, but so that when one pin is liberated from the catch in one arm by a vibration of the escapement another will be caught in the catch of the other arm thereof. The escapement being caused to vibrate by the motion of the connecting-rod *e* to which it is attached, as above described, and the type-wheel being caused to revolve by a separate and distinct power, as will be hereinafter described, the result is that the pins are caught alternately by the arms of the escapement, and the motion of the type-wheel is thus controlled—governed, in fact—by the making and breaking of the circuit.

The type-wheel is caused to revolve by a prime mover, such as a weight attached to the cord *g*, which is wound round the barrel *h*, fixed upon an axle hung in the frame, and having a ratchet with the necessary fixtures arranged in the ordinary and well-known way for winding up the weight, and also a cog-wheel, which engages with a pinion, *i*, with a cog-wheel at the opposite end of the axle of said pinion, which works into a pinion, *j*, keyed upon the same shaft that carries the type-wheel, the object of the whole being that the weight descending shall cause the type-wheel to revolve as fast as the movement of the escapement will permit it to do.

I have now described how the type-wheel is caused to revolve and the manner in which its motion is controlled by the escapement; and in order to better understand the object, application, and effect of the other parts of the printing-machine, it may be of use to notice here what would be the motion of the parts already described if put into operation without any additions being made thereto. If the weight attached to the cord *g*, causing the type-wheel to revolve, be wound up, and the circuit of conductors be broken and closed in rapid succession, the arms of the escapement will vibrate and the type-wheel will revolve step by step as fast as permitted by the vibrations of the escapement. If the circuit were broken or closed and so kept momentarily, the type-wheel would be held in one position by the escapement so long as the circuit remained so broken or closed.

Other apparatus is necessary to cause the machine to print, and it is as follows:

B is a cylinder or drum, which I call the "paper-cylinder." The axle upon which this cylinder is placed is hung in two small metallic posts or arms, *l l*, the lower ends of which are attached to an axle hung in the frame, with or on which they vibrate, carrying said cylinder to and from the type-wheel. *m m* are small metallic rods connecting by a joint with the upper ends of the posts *l l*. These rods are more distinctly exhibited by Figs. 5 and 7 of Sheet I of the drawings, which are respectively a plan and elevation of said rods and the parts to which they are connected, the angles being formed in the rods to accommodate the space between them to the length and movement of the paper-cylinder. The axle of the cylinder turns in boxes in the tops of the posts and is held down by the pressure of the springs *o o*. The ends of these rods *m m* are attached to eccentric-rings which surround eccentrics on the shaft *n*, so that when the shaft *n* revolves (as I shall hereinafter describe) the paper-cylinder B is projected forward and drawn back by said eccentrics acting on the rods, the paper-cylinder being hung on the posts or arms to which the rods are attached, and these latter being capable of vibration, as before described.

The paper on which the characters are to be printed may be wound round the cylinder B. This paper-cylinder must be hung at such a distance from the type-wheel that each revolution of the eccentric-shaft *n* will bring the paper wound round the paper-cylinder in contact with one of the types, and the paper must also have such motion as will insure proper spaces between the various characters printed thereon. There are two catches, *q* and *p*, Figs. 3, 5, 6, and 7 of Sheet I of the drawings, which extend the length of the cylinder and work in notches formed in one edge of one end of the paper-cylinder, said edge extending a little above the paper and answering the purpose of a ratchet-wheel. The catch *q* is attached to the side of the frame by the pins or screws at *q q*, forming an axis on which it turns.

Under the catches are springs by which they are sustained and kept in the notches. The catch *p* is permanently attached to the posts or arms on which the paper-cylinder is hung, so that it moves with the paper-cylinder in its motion to and from the type-wheel. The catch *p* also works in the notches in the end of the cylinder. The effect of these catches in causing the cylinder to revolve is as follows: When the cylinder is moved back from the type-wheel the catch *q* takes into the said notches and turns the cylinder far enough to move the last letter printed out of the way of the next to be printed, and as the catch *p* retains its position it prevents the cylinder from turning back, and thus the cylinder is turned forward sufficiently far to space the letters each time that it is projected forward by the eccentric *n*, as before described.

A screw is cut upon one end of the paper-cylinder axle, and the box in which it runs is a nut. The cylinder will therefore be moved endwise as it revolves and the letters will be printed in a helix round the cylinder. When the cylinder has moved endwise its whole length it is to be lifted out of the grooves in the posts and set back, so as to commence the printing again at the other end of the cylinder; or the paper-cylinder may not move endwise, in which case the paper round the cylinder must run off as the cylinder revolves, being supplied from a wheel shown in dotted lines in Fig. 3, Sheet I, and carried off by a weight or pressure-roller. Figs. 9 and 10 of Sheet I show an arrangement of this kind.

The material most convenient to be used for the printing, instead of ink, is plumbago, with which the type may be supplied by the small wheel or roller *r*, hung in the frame over the type-wheel. The roller *r* is hung so that it will revolve by the friction of the surface of the roller coming into contact with the type. The plumbago or other coloring-matter may be placed in a groove cut in the periphery of said roller and covered by a suitable substance. Woolen cloth answers a good purpose. The plumbago will work through the cloth sufficiently to supply the type coming into contact with the cloth.

The paper-supporter and the mechanical devices causing it to move so as to press upon the types of the type-wheel and then to retreat from them are in fact, therefore, a printing apparatus; and this press or apparatus has only one important new feature—namely, that the paper is pressed upon the type, instead of the type being moved so as to press upon the paper, as was done in printing-telegraphs described prior to the date of my invention; and this feature is useful, as when employed it relieves the type-wheel or the types on that wheel from a motion which might interfere with the proper regulation of the rotation of the type-wheel, and it certainly renders the apparatus less complex in construction.

The inking apparatus, consisting of a grooved roller pressing upon the type and having the groove charged with coloring-matter, is a convenient and simple way of applying color to the type, and from the fact that the types are in a single line the grooving of the roller, although apparently a small matter, becomes a really important feature in the successful working of the apparatus.

I will now explain the manner in which the shaft *n*, having the eccentrics to which the rods *m m* are attached, is caused to revolve, and also how its revolutions are regulated.

The power causing the revolutions of said shaft is a prime mover consisting of a weight attached to the end of a cord, *k*, which cord is wound round a barrel or drum having a ratchet-wheel and cog-wheel arranged for the convenience of winding up the weight by means of a crank similarly to the like fixtures connected with the weight attached to the cord *g*, as above described. Fig. 4 of Sheet II is a section through one of these barrels, ratchet-wheels, cog-wheels, and the axles on which they are hung.

The cog-wheel attached to the axle of the barrel S works in and carries the pinion and axle *t*. The cog-wheel *g* on the opposite end of this axle works into a pinion attached to the shaft *n*, and thus this is caused to revolve by a series of wheels and pinions so arranged as to get up velocity. If, now, no regulator or obstruction were interposed, the shaft *n* would revolve constantly and with great velocity until the weight attached to the end of the cord *k* had run down, and would carry the paper-cylinder to and from the type-wheel at each revolution; but in order to print any given letter it is necessary that the shaft *n* should revolve only when the type of the character desired to be printed is brought opposite the paper-cylinder by the type-wheel, and when one of the finger-keys marked with that character is pressed down. To accomplish this I use the following contrivance:

*u* is a lever, with one end attached to the frame by an axle, forming a fulcrum, on which it works, the bent end of the lever being capable of playing up and down by the side of the type-wheel opposite to that on which the escapement before described works. In the side of the type-wheel on which said lever works, and at a short distance from the periphery of said wheel, are inserted small metallic pins. These pins correspond in number with the protuberances on the wheel, and are placed on radial lines drawn from the center of said wheel to the types. The position of these pins are represented by the small quadrants and circles in Fig. 1 of Sheet II of the drawings, it being understood, however, that these round pins are on the side of the wheel opposite to that which is represented by said last-mentioned figure, the quadrants on the side of the wheel exhibited representing the pins and the form of the same upon which the escapement works, as before described.

*a* and *b* of Fig. 2, Sheet II, show the form of one of the escapement-pins and one of the round pins detached from the wheel. The small end of said lever has a straight surface, shaped substantially as shown, so that it may be struck by the pins in succession as the wheel revolves, or fall between any two of them when the wheel stops. A rod, *z*, is attached to said lever by means of a joint, on which it works. The lower end of this rod is connected with a hydraulic regulator, C, so constructed that the rod *z* and the lever *u* to which it is attached may rise rapidly, but cannot fall or pass downward to any extent, except when the type-wheel is fully stopped.

The construction and operation of the hydraulic regulator I shall hereinafter explain.

In the side of lever *u* is fixed a pin, *v*, and firmly fixed upon the shaft *n*, above described, is a thin metallic wheel, E, scroll-shaped, and shown by Figs. 11 and 12, Sheet I of the drawings. The pin *v* in the lever slides on the periphery of this wheel as the wheel revolves. That part of the circumference of this wheel farthest from the center is made thicker than the other part of the wheel. In this thick part of the wheel are formed two catches or shoulders, *w* and *x*, which successively engage the pin *v* as the wheel revolves, thereby stopping the motion of the wheel. These catches or shoulders are some distance apart, *x* being farther from the center of motion of the wheel than *w*, so that when the wheel revolves the pin *v* will first engage with the catch or shoulder *w*, and, on being liberated from that, will next take against the shoulder *x*.

The shoulder *w* is so formed that the pin *v* is to be liberated from it by being raised; but the shoulder *x* is a small projection of the thick part of the wheel, having a space worked out under it, so that when the pin engages with it it can only be liberated by falling below and passing out on the under side of the catch or shoulder. This wheel and the lever *u*, with the pin *v*, operate together thus: As the wheel E revolves with the shaft on which it is fixed the pin *v* (supposing it to start from that part of the wheel nearest to the center of motion) will slide over the periphery of the wheel, the lever being gradually raised thereby until the pin *v* comes in contact with the shoulder *w*, which will stop the motion of the eccentric-wheel and its shaft. The wheel and shaft will then remain stationary until the lever *u* be raised so as to lift the pin *v* over the catch *w*, and this will be done by the first round pin in the type-wheel which strikes the end of the lever, the round pins in the type-wheel striking the end of the lever at *y* as the type-wheel revolves. On this being done the said scroll-wheel and shaft will revolve the distance between the shoulders *w* and *x*, and the pin *v* will then engage with the shoulder *x*, and the motion of the wheel and shaft will again be stopped.

As above stated, the pin can only be extricated from the shoulder *x* by falling below it and passing out on the under side; but this it cannot do while the type-wheel is in motion, for as the lever is prevented from falling suddenly by the hydraulic regulator, and as the pins successively strike the end of the lever *y*, the lever is kept up and the pin *v* rests against the shoulder *x* until the type-wheel is stopped. When the type-wheel is stopped the small bent end of the lever falls between two of the round pins, the pin *v* at the same time falls below the shoulder *x* and onto the circumference of the scroll-wheel nearest its center of motion, and the wheel and shaft *n* revolve, lifting the lever until the pin *v* again takes against the shoulder *w*, as before. The shaft *n* is thus caused to revolve when the type-wheel is stopped, bringing the paper-cylinder in contact with the type by means of the eccentric and connecting rod before described.

Fig. 13 of Sheet I of the drawings is a vertical section through the hydraulic regulator used to regulate the motion of the lever *u*, above described. It consists of an exterior glass vessel, *a*, which should be made water-tight, and when in operation nearly filled with water or other suitable liquid. Within this glass vessel, and fixed to the bottom thereof, is a small cylindrical vessel, *b b*, with holes in the sides, through which water may pass. At the top it is flanged, as at *c c*, with a screw cut in its outer edge, on which is screwed water-tight a frustum of a cone, *d d*.

*e* is a guide properly supported near the upper end of the cylinder *b b*. In this guide works the spindle of a puppet-valve, *f*, which valve is seated on the shoulder *c c*.

*g* is a hollow plunger working through the top of the valve-chamber *d d*. To the top of this plunger is attached a rod, *z*, which extends out through the neck of said glass vessel.

The piston or plunger may be solid or hollow; but it is better to have it hollow in order that it may be light. The sides of the valve-chamber *d d* converge toward the top. The piston or plunger should work loosely in the top of the valve chamber *d d*, leaving a space between the two sufficient for water to pass in small quantities.

The operation of this hydraulic regulator is as follows: When the plunger *g* is raised by the lever *u*, attached to the rod *z*, as described, the water passing through the holes in the side of the cylinder *b b* raises the valve *f*, and the chamber *d d* is filled with water. When the piston or plunger descends the water which it displaces passes between said plunger and the sides of the chamber *d d*, in which it works, and as this space is small, permitting the water to escape slowly, the plunger must descend very slowly; but having no resistance to overcome, except the weight of the plunger, it can ascend rapidly, and thus, in connection with the pins, regulates the motion of the lever *u*, as above described.

In operating with my contrivance as a whole the following are the different stages or progressive steps, from the touching of a key to the printing of the letter correspondent with that key, the description being given so generally that it can be clearly understood by the aid of the foregoing, but not so much in detail as to introduce unnecessary repetition. The first thing to be done is to see that the battery or batteries are in working order, the circuit properly connected, and the clocks or weights wound up, and the characters on the type-wheel angularly or in angular position, correspondent with the pins on the key-shaft—that is to say, when the pin of key A touches that key then must the type A be opposite the printing and paper-governing cylinder; and this adjustment may be made by the two operators when certain predetermined signals are made, such as by one of them knocking any given number of times on any predetermined letter-key, and the other then shifting his type-wheel until such predetermined letter is repeatedly printed by such repeated knocks. These preliminaries being adjusted, the clock of the composing-machine is suffered to start. The key-shaft will start with it, and as the revolving part of the circuit travels contacts will be made and broken and the type-wheel will revolve step by step synchronously and through equal arcs with the circuit-wheel. When any letter is desired to be printed the operator presses down its key. The key-shaft stops when it comes in proper angular position. So does the revolving part of the circuit; and circuit is maintained broken or closed so long as the key is held down. The spring that carries the pieces of steel in the coil remains stationary. The clock and escapement which it controls stops, the type-wheel also stops, the lever connected with the hydraulic regulator falls, the clock or prime mover actuating the printing-press starts or begins to act, the paper is brought up to the type, and the letter is printed. When the key is permitted to rise the key-shaft again commences to travel, circuit is again broken and closed rapidly, the spring that carries the pieces of steel in the coils moves up and down and permits the prime mover to move the escapement, and as the latter vibrates the type-wheel again moves step by step through the same arcs in the same times that the revolving portion of the circuit does. When another key is pressed the printing is repeated, in the manner as before explained, and when that key is released the revolving part of the circuit and the type-wheel again commence to revolve synchronously.

Now, by such mode of operation, it will be perceived that the printing apparatus is permitted to act sometimes by the power of the spring when circuit is broken, sometimes by the power of electro-magnetism overcoming the spring when circuit is closed; and this feature is important, as it increases the rapidity of working when contrasted with the plan formerly proposed by others, in which printing took place only when circuit was closed; and the feature of permitting the prime mover to print at the breaking of the circuit is, I believe, new with me.

By my mode of operation it will also be perceived that the prime mover, which gives motion to the rotating part of the circuit, is always in operation, and not alternately both stopped and started at the printing of each letter.

I have now described the mechanism and arrangement thereof sufficient to transmit intelligence from the place at which the composing-machine is stationed to the place at which the printing-machine is stationed; but it will be important to reverse the order of such communication between the same points or places, and this may be done by having one composing-machine and one printing-machine stationed at each place or point and connected with the same circuit of conductors, in like manner as described above. Also, the intelligence may be communicated to and recorded at any intermediate place or places between the two most distant points or termini by having at such intermediate place or places a printing-machine like the one described above, and connected at such intermediate place or places with the circuit of conductors in like manner as the printing-machine is connnected with the said circuit of conductors at the most distant place or termini, as described.

When a message is about to be transmitted it may be necessary for the person tending the composing-machine to give notice of the same to the person tending the printing-machine by an alarm. This is effected as follows: F of Figs. 3 and 4 of Sheet I of the drawings is a bell, and *a* its knocker or hammer, attached to the frame by a spring at the lower end. In the side of the eccentric wheel E is a pin, *b*, against which the handle of the hammer rests. When the eccentric wheel revolves this pin lifts the hammer and permits it to fall upon the bell, thus making a stroke and giving an alarm at each revolution of the eccentric. When the operator at the printing-station has been thus notified the hammer may be held out of action by a hook attached to the frame.

I wish it understood that I do not mean to limit my invention by the precise description hereinbefore given to the precise form, arrangement, or construction of parts described, nor to the use of all of them or their equivalents in combination, as several of the combinations invented by me may be used as parts of a printing-telegraph when the remaining parts are replaced by others either equivalents or not equivalents of those described by me.

I claim as of my own invention—

1. A series of keys each corresponding to a character, in combination with a revolving part of a circuit, so that the touching of one of the former may cause circuit to be broken or closed for the purpose of printing, substantially as specified, when the revolving part of the circuit is in a certain required angular position properly corresponding to the key struck.

2. A series of keys, each corresponding to a character, in combination with a revolving portion of a circuit and a shaft provided with pins arranged in a helix, all substantially such as specified, or the equivalents of the whole, acting to cause circuit to be broken or closed when the revolving part is in a certain angular position, in proper correspondence with the key struck, for the purpose of printing a proper corresponding letter by means of any suitable machinery.

3. A key-board or series of keys, in combination with a rotating portion of a circuit and a type-wheel or its equivalent so governed as to present a proper letter corresponding with a key touched to produce an impression, the combination being substantially such as set forth.

4. In combination, a single circuit of conductors, (a key-board or series of keys, a revolving portion of a circuit, and a type-wheel,) substantially such as specified, and these also in combination with a printing-press and with a key-shaft, or either of them, each part being substantially such as described.

5. A series of keys, each corresponding to a character, in combination with a type-wheel having similar corresponding characters both substantially as specified, when so connected by any appropriate devices that a certain type shall be in a certain locality when a corresponding key is actuated, and these two elements in combination with a single circuit of conductors and with a printing apparatus, or either of them.

6. Actuating or driving a revolving portion of a circuit or a key-shaft, or both of them, by means of a prime mover acting upon them through a friction-connection, the mode of operation being substantially as specified, and doing away with sudden jars and increasing rapidity of operation, when contrasted with a positive connection between such parts and a prime mover, and also permitting the two to move with varying velocities.

7. Actuating or driving a key-shaft and a revolving portion of a circuit, or either of them, by means of a friction-connection with a prime mover, when the velocity of such prime mover is controlled by a governer or some equivalent for the purpose which either prevents its moving too fast or increases its velocity when going too slow, or performs both these duties substantially under the mode of operation described.

8. Governing or controlling the motions of a prime mover which actuates a printing apparatus by the breaking and closing of an electric or galvanic circuit, so that such apparatus is put in operation both by the breaking of a circuit and the closing thereof, substantially in the manner specified, and also the controlling of a printing apparatus, so that it shall be permitted to print when a spring returns to its normal position at the time that a circuit is broken, the mode of operation being substantially such as set forth.

9. In a printing-telegraph, moving the paper to the types to produce an impression on the former, substantially in the manner described, as distinguished from former modes of operation, by which the types were moved toward the paper.

10. In combination, a revolving type-wheel and a roller or its equivalent charged with coloring-matter, so as to deposit such matter on the types as they in succession come in contact with the roller, the combination being substantially such as set forth, and this I claim also when the roller is grooved, as described.

11. Being aware of the facts that type-wheels have been permitted to revolve step by step when controlled by escapements, and when such escapements have been actuated either by a prime mover governed by a pendulum or by electric magnetic force, I claim actuating an escapement which controls the motions of a type-wheel by a prime mover whose motions are regulated by the breaking and closing of a circuit under a mode of operation substantially such as described, whereby a small force derivable from magnetism controls any necessary power of a prime mover, there being a breaking and a closing of circuit correspondent with each vibration of the escapement.

12. A hydraulic regulator substantially such as described, and for the purposes set forth.

13. A hydraulic regulator, in combination with a type-wheel and a printing apparatus and a prime mover, the combination being substantially as specified, and causing the press to print when the type-wheel ceases to move for a longer time than usual.

14. In combination with a type-wheel and a printing-press or apparatus, apparatus, substantially such as specified, for making an alarm when that apparatus is permitted or caused to act by the breaking and closing of the same circuit of conductors, which, by its breaking and closing, permits the printing apparatus to come into action.

In testimony whereof I have hereunto subscribed my name December 27, 1858.

ROYAL E. HOUSE.

In presence of—
GERARDUS C. KING,
METVILLE V. BIGGS.